(12) United States Patent
Ye et al.

(10) Patent No.: US 8,779,746 B2
(45) Date of Patent: Jul. 15, 2014

(54) METHODS AND APPARATUS FOR CONSTANT POWER/CURRENT CONTROL FOR SWITCH-MODE POWER CONVERTERS

(75) Inventors: Zhong Ye, Plano, TX (US); Shamim Choudhury, Wylie, TX (US); Chris Michael Franklin, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 234 days.

(21) Appl. No.: 13/097,644

(22) Filed: Apr. 29, 2011

(65) Prior Publication Data
US 2012/0274290 A1     Nov. 1, 2012

(51) Int. Cl.
G05F 1/00        (2006.01)
(52) U.S. Cl.
USPC ........................................... 323/285
(58) Field of Classification Search
USPC .................. 323/222–225, 266, 282–286
See application file for complete search history.

(56) References Cited

U.S. PATENT DOCUMENTS

| | | | |
|---|---|---|---|
| 4,661,898 A | 4/1987 | Hase | |
| 7,071,668 B2 * | 7/2006 | Sasaki | 323/290 |
| 7,564,700 B2 | 7/2009 | Hansson et al. | |
| 7,724,553 B2 * | 5/2010 | Wong et al. | 363/98 |
| 2004/0257271 A1 * | 12/2004 | Jacobson et al. | 342/175 |
| 2008/0174291 A1 * | 7/2008 | Hansson et al. | 323/283 |
| 2009/0289557 A1 * | 11/2009 | Itoh et al. | 315/127 |
| 2010/0277139 A1 * | 11/2010 | Huang et al. | 323/234 |
| 2010/0301821 A1 | 12/2010 | Kung et al. | |
| 2010/0308733 A1 * | 12/2010 | Shao | 315/119 |
| 2011/0175587 A1 * | 7/2011 | Hosotani | 323/283 |

FOREIGN PATENT DOCUMENTS

JP        2004109444        4/2004

OTHER PUBLICATIONS

"Analysis and Interpretation of Loop Gains of Multiloop-Controlled Switching Regulators", IEEE Transactions on Power Electronics, vol. 3, No. 4, pp. 489-498, Oct. 1988 (Ridley, et al.).
PCT Search Report mailed Jan. 14, 2013.

* cited by examiner

*Primary Examiner* — Timothy J Dole
*Assistant Examiner* — Yusef Ahmed
(74) *Attorney, Agent, or Firm* — William B. Kempler; Frederick J. Telecky, Jr.

(57) ABSTRACT

In a first aspect, a control circuit is provided for use with a switch-mode power stage that provides an output voltage signal and an output current signal at an output power. The switch-mode power stage has a nominal voltage, a nominal current, a maximum current, an output power and a maximum power. The control circuit includes a voltage control loop and a current control loop, and the control circuit uses the voltage control loop to provide voltage mode control if the output current signal is greater than or equal to the nominal current and less than the maximum current, wherein the output power is substantially constant. Numerous other aspects are also provided.

16 Claims, 7 Drawing Sheets

METHODS AND APPARATUS FOR CONSTANT POWER/CURRENT CONTROL FOR SWITCH-MODE POWER CONVERTERS

BACKGROUND

This invention relates generally to switch-mode power converters. More particularly, this invention relates to methods and apparatus for constant power/current control for switch-mode power converters.

Switch-mode power converters typically include one or more semiconductor switches and energy storage elements, such as inductors and capacitors, and operate by switching the energy storage elements between various circuit configurations at a predetermined switching frequency. In a pulse-width modulated ("PWM") converter, the output voltage or current of the power converter can be regulated by varying the duty cycle of one or more control signals applied to the switches.

Various analog and digital control methods have been used to provide line and load regulation of switch-mode power converters, such as DC-DC, AC-DC, DC-AC and AC-AC converters. For example, previously known control techniques for switch-mode power converters include constant power and current control.

To provide constant power and current control, two control loops are required: a voltage control loop and a current control loop. In a previously known constant power and current control system, sometimes referred to as a "voltage/current mode switching controller," the voltage control loop provides voltage mode control in a constant voltage region of operation, the current control loop provides current mode control in constant power and constant current regions of operation, and control circuitry "ORs" the voltage control loop output and the current control loop output, and uses the smaller of the two outputs to generate a PWM signal.

Figure 1:
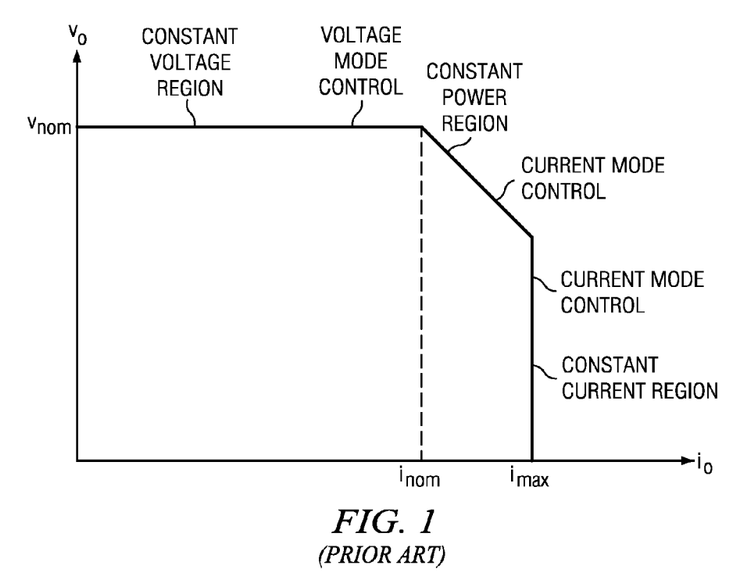
FIG. 1 is diagram depicting control modes of previously known power converters.

For example, FIG. 1 illustrates the operation of a previously known constant power and current control system for a voltage/current mode switching controller having a nominal output voltage $v_{nom}$, a nominal output current $i_{nom}$, a specified maximum output current $i_{max}$, and a specified maximum output power $P_{max}$. In this control system, for output current $i_o$ values less than $i_{nom}$, voltage mode control is used. In particular, the voltage control loop compares the converter output voltage $v_o$ to a reference voltage, the error signal is provided to a compensator, and the compensator's output is used to set a switch duty ratio of the converter so that output voltage $v_o$ equals a desired value (e.g., $v_{nom}$).

For output current $i_o$ values greater than or equal to $i_{nom}$, control switches from voltage mode control to current mode control. In particular, for output current $i_o$ values greater than or equal to $i_{nom}$, but less than $i_{max}$, the current control loop compares the converter output current $i_o$ to a reference current, the error signal is provided to a compensator, and the compensator's output is used to set a switch duty ratio of the converter. The current loop's reference current is set to ($P_{max}/v_o$) so that the converter output power, $P_o=(v_o*i_o)$, is constant (e.g., $P_{max}$). For higher loads, the current control loop clamps the output current at a constant value $i_{max}$.

One problem with such previously known constant power and current control systems is loop saturation and output voltage overshoot. In particular, as the load increases, the duty cycle specified by the voltage control loop increases so that the converter can maintain the output voltage at $v_o=v_{nom}$, while supplying the required output current $i_o$. In such cases, for output current $i_o$ greater than $i_{nom}$, the voltage control loop may saturate (e.g., the specified duty cycle will be maximum) when control switches from voltage mode control to current mode control. To avoid such loop saturation, some previously known control systems include anti-saturation techniques, such as clamping the integrator.

Whether or not anti-saturation techniques are used, however, if the load suddenly decreases, control will switch back from current mode control to voltage mode control. As a result, if the voltage control loop is saturated (or if anti-saturation techniques set the voltage reference to a fixed value corresponding to $v_{nom}$), output voltage $v_o$ may exceed $v_{nom}$. Depending on load conditions, the output voltage overshoot may be unacceptably large, and may damage sensitive electronic circuitry. Although not depicted in FIG. 1, previously known average current control techniques have similar output voltage overshoot problems.

Accordingly, improved methods and apparatus for constant power and current control for switch-mode power converters are desirable.

SUMMARY

In a first aspect of the invention, a control circuit is provided for use with a switch-mode power stage that provides an output voltage signal and an output current signal at an output power. The switch-mode power stage has a nominal voltage, a nominal current, a maximum current, an output power and a maximum power. The control circuit includes a voltage control loop and a current control loop, and the control circuit uses the voltage control loop to provide voltage mode control if the output current signal is greater than or equal to the nominal current and less than the maximum current, wherein the output power is substantially constant.

In a second aspect of the invention, a control circuit is provided for use with a switch-mode power stage that provides an output voltage signal and an output current signal at an output power. The switch-mode power stage has a nominal voltage, a nominal current, a maximum current, an output power and a maximum power. The control circuit includes a voltage control loop and a current control loop, and the control circuit uses the current control loop to provide average current mode control if the output current signal is greater than or equal to the nominal current and less than the maximum current, wherein the output power is substantially constant.

In a third aspect of the invention, a method is provided for controlling a switch-mode power stage that provides an output voltage signal and an output current signal at an output power. The switch-mode power stage has a nominal voltage, a nominal current, a maximum current, an output power and a maximum power. The method includes using voltage mode control to provide a substantially constant output power if the output current signal is greater than or equal to the nominal current and less than the maximum current.

Other features and aspects of the present invention will become more fully apparent from the following detailed description, the appended claims and the accompanying drawings.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

Example methods and apparatus in accordance with this invention provide constant power/current control for both voltage/current mode switching control and average current control for switch-mode power converters.

In an example voltage/current mode switching control embodiment, voltage mode control is used to provide substantially constant output power. In addition, loop switching from voltage mode to current mode occurs at an output voltage value which is lower than nominal voltage. Moving the loop switching point and voltage reference value to this lower output voltage may substantially reduce any output voltage overshoot that occurs when control switches back from current mode to voltage mode.

In an example average current mode control embodiment, average current mode control is used to provide substantially constant output power. In addition, operation mode switching from constant power mode to constant current mode occurs at an output voltage value which is lower than nominal voltage. Moving the mode switching point and voltage reference value to this lower output voltage may substantially reduce any output voltage overshoot that occurs when control switches back from constant current mode to constant power mode.

In addition, in both example embodiments, if the output load drops, and control switches from constant current mode control to constant voltage mode control, the reference signal used for the voltage control loop is ramped from the lower output voltage value to nominal voltage. The ramp time may be controlled to further reduce output voltage overshoot.

Figure 2:
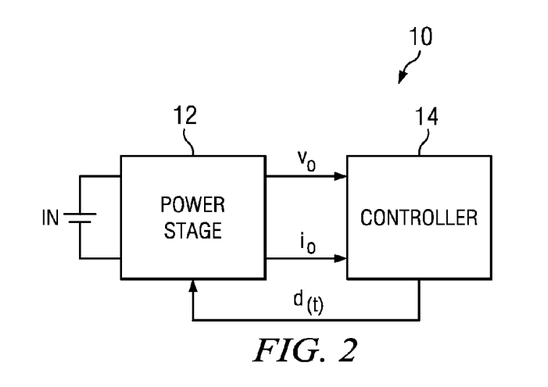
FIG. 2 is a block diagram of a power converter that includes an example controller in accordance with this invention.

Referring to FIG. 2, a block diagram of a power converter 10 that includes an example control circuit in accordance with this invention is described. In particular, power converter 10 includes a switch-mode power stage 12 and a controller 14. As described in more detail below, controller 14 includes a voltage control loop, a current control loop, and control circuitry (e.g., hardware and/or software) used to provide constant power/current control in accordance with this invention. Example techniques in accordance with this invention may be used with controllers 14 that implement a variety of different control techniques, such as voltage/current mode switching control and average current control.

Switch-mode power stage 12 has a first input node coupled to an input signal IN, and a second input node coupled to a control signal d(t), and provides a first output signal $v_o$ at a first output node, and a second output signal $i_o$ at a second output node.

Switch-mode power stage 12 may be a DC-DC, AC-DC, DC-AC or AC-AC power stage that converts input signal IN to first output signal $v_o$. For example, switch-mode power stage 12 may be a DC-DC switch-mode power stage that converts a DC input voltage IN to a DC output voltage $v_o$ and supplies an output current $i_o$ to a load (not shown in FIG. 1). Persons of ordinary skill in the art will understand that input signal IN alternatively may be a DC current or an AC voltage or current, and output signal $v_o$ alternatively may be a DC current or an AC voltage or current.

Switch-mode power stage 12 may be a buck converter, a boost converter, a buck-boost converter, or other similar converter, that may include one or more inductors, capacitors, diodes and switches (not shown in FIG. 2), as is known in the art. As described in more detail below, the switches are controlled by control signal d(t), which is a pulse-width modulated waveform having a duty ratio that may be controlled to regulate first output signal $v_o$ and/or second output signal $i_o$.

Controller 14 may be an analog controller, a digital controller, or a mixed analog/digital controller, and may include hardware, software, or a combination of hardware and software. In some example embodiments, controller 14 may be microprocessor or other similar digital controller. For example, controller 14 may be a UCD3040 microprocessor by Texas Instruments Inc., Dallas, Tex. Controller 14 may be a single controller, or may include multiple controllers.

Controller 14 has first and second input nodes coupled to receive first output signal $v_o$ and second output signal $i_o$, respectively, at the first and second output nodes, respectively, of switch-mode power stage 12. Controller 14 provides control signal d(t) at an output node coupled to the second input node of switch-mode power stage 12.

In example embodiments of this invention, first output signal $v_o$ and second output signal $i_o$ represent an output voltage and an output current, respectively, of switch-mode power stage 12. Persons of ordinary skill in the art will understand that first output signal $v_o$ alternatively may represent some other voltage of switch-mode power stage 12, and second output signal $i_o$ alternatively may represent some other current of switch-mode power stage 12. For simplicity, the remaining discussion refers to first output signal $v_o$ as output voltage signal $v_o$ and second output signal $i_o$ as output current signal $i_o$.

Switch-mode power stage 12 typically is designed to meet certain specified operating parameters, such as nominal output voltage $v_{nom}$, nominal output current $i_{nom}$, maximum output current $i_{max}$, and maximum output power $P_{max}$. Persons of ordinary skill in the art will understand that switch-mode power stage 12 may be designed to meet other and/or additional specified operating parameters.

Control signal d(t) may include one signal, or may include more than one signal (e.g., four signals as used in a PSPWM full-bridge converter) for controlling one or more switches in switch-mode power stage 12. For simplicity, control signal d(t) is described as including one signal in the remaining discussion. Persons of ordinary skill in the art will understand that example techniques in accordance with this invention easily may be modified to generate control signals d(t) that include more than one signal.

As described in more detail below, controller 14 includes a voltage control loop, a current control loop, and control circuitry (e.g., hardware and/or software) that provides reference signals to the voltage control loop and the current control loop to provide constant power/current control in accordance with this invention.

Methods and apparatus in accordance with this invention may be used to provide constant power/current control in controllers 14 that use a variety of different control techniques, such as voltage/current mode switching control, and average current control. Examples of each will be described in turn.

Constant Power/Current Control in Voltage/Current Mode Switching Controllers

Figure 3:
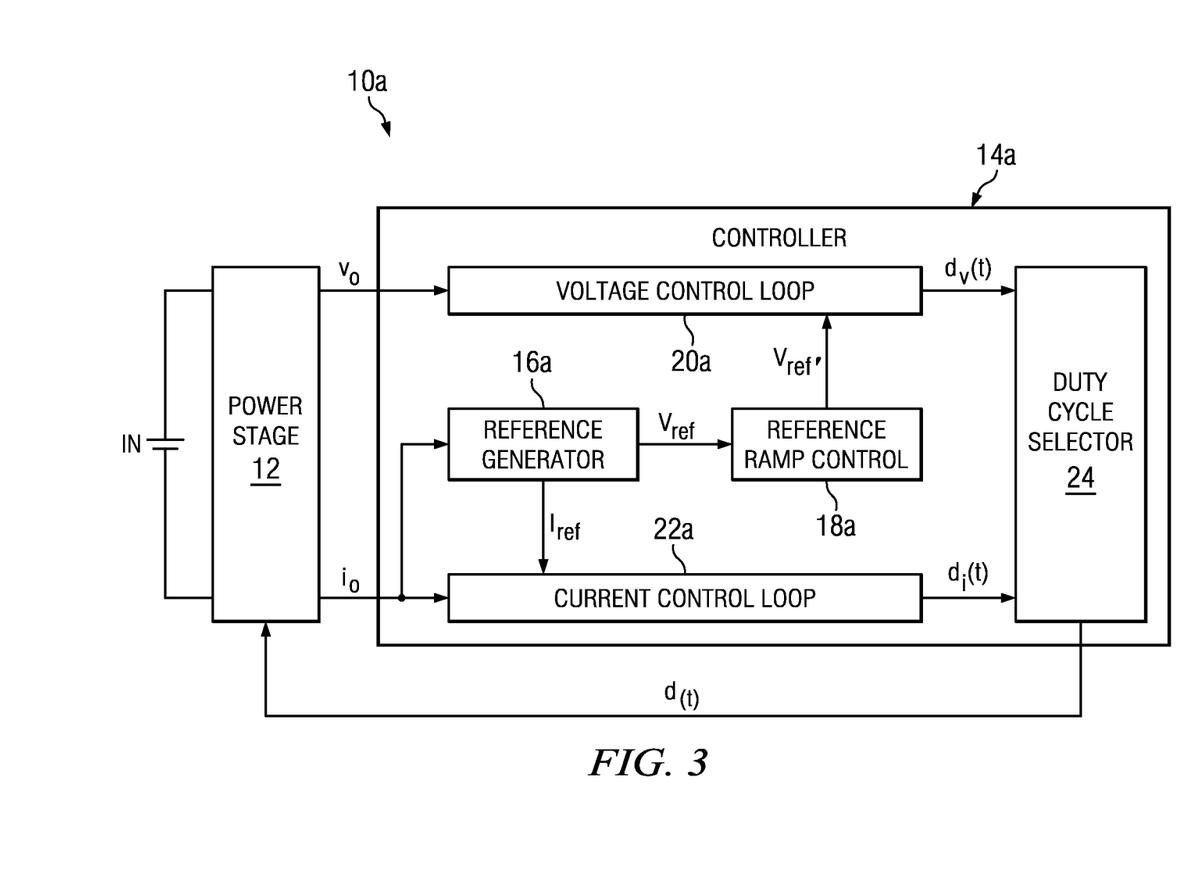
FIG. 3 is a block diagram of an example embodiment of the power converter of FIG. 1.

Referring now to FIG. 3, a block diagram of an example power converter 10a is described that uses voltage/current mode switching control, and that implements constant power/current control in accordance with this invention. In particular, controller 14a includes a reference generator 16a, a reference ramp control circuit 18a, a voltage control loop 20a, a current control loop 22a, and a duty cycle selector circuit 24. Each of these will be described in turn.

Reference generator circuit 16a includes an input node coupled to receive output current signal $i_o$ at the second output node of switch-mode power stage 12, and provides a current reference signal $I_{ref}$ at a first output node, and a first voltage reference signal $V_{ref}$ at a second output node. Reference generator circuit 16a may be implemented in hardware and/or software, and will be described in more detail below.

Reference ramp control circuit 18a includes an input node coupled to receive first voltage reference signal $V_{ref}$ at the second output node of reference generator circuit 16a, and provides a second voltage reference signal $V_{ref}'$ at an output node. Reference ramp control circuit 18a may be implemented in hardware and/or software, and will be described in more detail below.

Voltage control loop 20a includes a first input node coupled to receive output voltage signal $v_o$ at the first output node of switch-mode power stage 12, and a second input node coupled to receive second voltage reference signal $V_{ref}'$ at the output node of reference ramp control circuit 20a, and provides a first control signal $d_v(t)$ at an output node. In example embodiments of this invention, first control signal $d_v(t)$ may be a first duty cycle signal. For simplicity, first control signal $d_v(t)$ will be referred to herein as voltage duty cycle signal $d_v(t)$. Voltage control loop 20a may be implemented in hardware and/or software, and will be described in more detail below.

Current control loop 22a includes a first input node coupled to receive output current signal $i_o$ at the second output node of switch-mode power stage 12, and a second input node coupled to receive current reference signal $I_{ref}$ at the first output node of reference generator circuit 16a, and provides a second control signal $d_i(t)$ at an output node. In example embodiments of this invention, second control signal $d_i(t)$ may be a second duty cycle signal. For simplicity, second control signal $d_i(t)$ will be referred to herein as current duty cycle signal $d_i(t)$. Current control loop 22a may be implemented in hardware and/or software, and will be described in more detail below.

Duty cycle selector circuit 24 includes a first input node coupled to receive voltage duty cycle signal $d_v(t)$ at the output node of voltage control loop 20a, and a second input node coupled to receive current duty cycle signal $d_i(t)$ at the output node of current control loop 22a, and provides control signal $d(t)$ an output node coupled to the second input node of switch-mode power stage 12. Duty cycle selector circuit 24 may be implemented in hardware and/or software, and will be described in more detail below.

As described in more detail below, voltage control loop 20a generates voltage duty cycle signal $d_v(t)$ based on a difference between output voltage signal $v_o$ and second voltage reference signal $V_{ref}'$, current control loop 22a generates current duty cycle signal $d_i(t)$ based on a difference between output current signal $i_o$ and current reference signal $I_{ref}$, and duty cycle selector circuit 24 generates control signal $d(t)$ based on voltage duty cycle signal $d_v(t)$ and current duty cycle signal $d_i(t)$.

In addition, as described in more detail below, reference generator 16a generates first voltage reference signal $V_{ref}$ and current reference signal $I_{ref}$ to control switching between voltage mode control and current mode control of switch-mode power stage 12.

Further, as described in more detail below, reference ramp control circuit 18a generates second voltage reference signal $V_{ref}'$ based on first voltage reference signal $V_{ref}$. In particular, $V_{ref}'=V_{ref}$ except when controller 14a switches from current mode control to voltage mode control (e.g., when the load on switch-mode power stage 12 suddenly releases). In that instance, second voltage reference signal $V_{ref}'$ ramps up from first voltage reference signal $V_{ref}$ to nominal output voltage $v_{nom}$. In this regard, the voltage reference controllable ramp is used to reduce $v_o$ overshoot. As described in more detail below, the ramp time can be controlled to substantially reduce $v_o$ overshoot.

Figure 4:
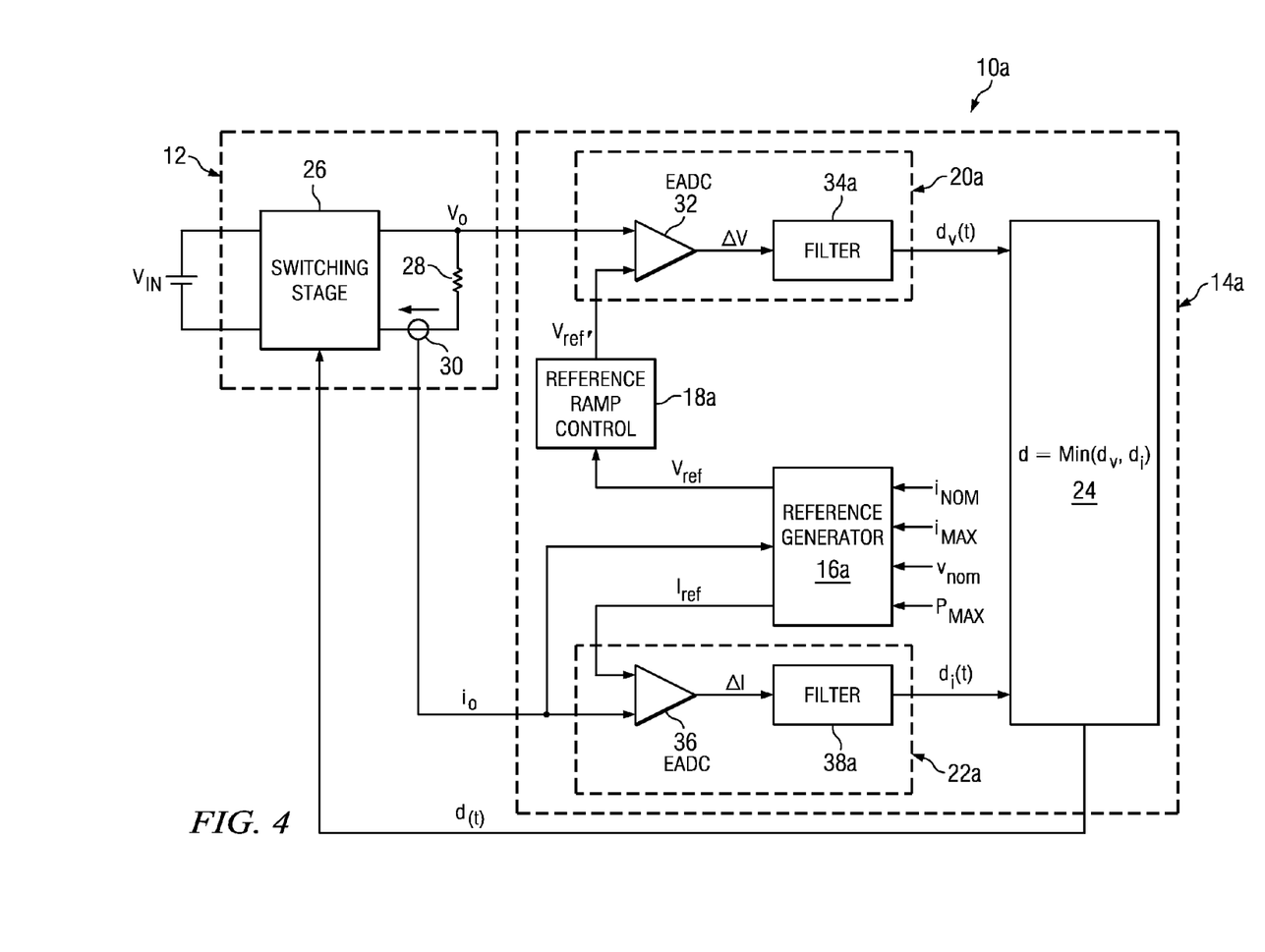
FIG. 4 is a more detailed block diagram of the power converter of FIG. 3.

Referring now to FIG. 4, a more detailed example embodiment of power converter 10a is described. In this example, input signal IN is an input voltage signal $V_{in}$. Persons of ordinary skill in the art will understand that input signal IN alternatively may be an input current signal. For simplicity, the remaining discussion refers to input signal IN as input voltage signal $V_{in}$.

Switch-mode power stage 12 includes a switching stage 26, a load 28, and a current sense device 30. Switching stage 26 may be any conventional switching network, and may include one or more switches (not shown) controlled by control signal $d(t)$ having a clock frequency $f_s$. Clock frequency $f_s$ may be between about 50 KHz to about 5 MHz, although other clock frequencies may be used. For simplicity, load 28 is depicted as a resistor, but may be any type of load.

Current sense device 30 may be a resistor, a Hall effect sensor, an inductor DC resistance, or other similar device for detecting output current signal $i_o$ in load 28. Current sense device 30 may be in series with load 28, as shown in FIG. 4, or may be implemented by measuring parameters of some other circuit element in switching stage 26. In this regard, current sense device may directly detect output current signal $i_o$, or may indirectly detect output current signal $i_o$ based on some other current in switch-mode power stage 12 that is proportional to output current signal $i_o$.

Voltage control loop 20a includes an error-analog-to-digital converter ("EADC") 32 and a filter 34a. EADC 32 has a first input node coupled to receive output voltage signal $v_o$ at the first output node of switch-mode power stage 12, a second input node coupled to receive second voltage reference signal $V_{ref}'$ at the output node of reference ramp control circuit 18a, and provides a voltage error signal $\Delta V$ at an output node.

Second voltage reference signal $V_{ref}'$ equals the desired output voltage of switch-mode power stage 12. Alternatively, second voltage reference signal $V_{ref}'$ may equal a fraction of the desired output voltage of switch-mode power stage 12.

EADC 32 samples the difference between output voltage signal $v_o$ and second voltage reference signal $V_{ref}'$, and converts the difference to a digital voltage error signal $\Delta V$ (e.g., $\Delta V=V_o-V_{ref}'$) at a sampling rate $f_{ad1}$. Sampling rate $f_{ad1}$ is typically about 20 times the loop bandwidth, although other sampling frequencies may be used. Persons of ordinary skill in the art will understand that other techniques may be used to generate voltage error signal $\Delta V$. For example, EADC 32 may be replaced with an analog differencing circuit and a conventional A/D converter.

Filter 34a has an input node coupled to receive voltage error signal $\Delta V$ at the output node of EADC 32, and provides voltage duty cycle signal $d_v(t)$ at an output node. Filter 34a conditions output voltage signal $v_o$ so that any differences between output voltage signal $v_o$ and second reference voltage signal $V_{ref}'$ are made small (ideally, $\Delta V=0$). The conditioning is performed to reduce the difference in the presence of disturbances, such as load steps, input voltage variations, component variations, temperature effects, and other similar disturbances).

For example, filter 34a may have a gain of 1000, a first zero at 1 KHz, a second zero at 1 KHz, and a pole at 10 KHz, although other parameters may be used. Filter 34a is essentially a compensator. In some example embodiments, filter 34a may be implemented as a PID structure. Persons of ordinary skill in the art will understand that other filter types and parameters may be used. Persons of ordinary skill in the art also will understand that filter 34a is sometimes referred to as a "compensator," or a "control law accelerator" (e.g., for digital implementations).

Current control loop 22a includes an EADC 36 and a filter 38a. EADC 36 has a first input node coupled to receive output current signal $i_o$ at the second output node of switch-mode power stage 12, a second input node coupled to receive current reference signal $I_{ref}$ at the first output node of reference generator circuit 16a, and provides a current error signal $\Delta I$ at an output node.

Current reference signal $I_{ref}$ equals the desired output current of switch-mode power stage 12. Alternatively, current reference signal $I_{ref}$ may equal a fraction of the desired output current of switch-mode power stage 12.

EADC 36 samples the difference between output current signal $i_o$ and current reference signal $I_{ref}$, and converts the difference to a digital current error signal $\Delta I$ (e.g., $\Delta I=i_o-I_{ref}$) at a sampling rate $f_{ad2}$. Sampling rate $f_{ad2}$ is typically about 20 times the loop bandwidth, although other sampling frequencies may be used. Persons of ordinary skill in the art will understand that other techniques may be used to generate current error signal $\Delta I$. For example, EADC 36 may be replaced with an analog differencing circuit and a conventional A/D converter.

Filter 38a has an input node coupled to receive current error signal $\Delta I$ at the output node of EADC 36, and provides current duty cycle signal $d_i(t)$ at an output node. Filter 38a conditions output current signal $i_o$ so that any differences between output current signal $i_o$ and reference current signal $I_{ref}$ are made small (ideally, $\Delta I=0$). The conditioning is performed to reduce the difference in the presence of disturbances, such as load steps, input voltage variations, component variations, temperature effects, and other similar disturbances).

For example, filter 38a may have a gain of 1000, a first zero at 1 KHz, a second zero at 1 KHz, and a pole at 10 KHz, although other parameters may be used. In some example embodiments, filter 38a may be implemented as a PID structure. Persons of ordinary skill in the art will understand that other filter types and parameters may be used. Persons of ordinary skill in the art also will understand that filter 38a is sometimes referred to as a "compensator," or a "control law accelerator" (e.g., for digital implementations).

Duty cycle selector 24 provides control signal $d(t)$ equal to the smaller of voltage duty cycle signal $d_v(t)$ and current duty cycle signal $d_i(t)$. Duty cycle selector 24 may be implemented in hardware and/or software.

As previously mentioned, reference generator circuit 16a includes an input node coupled to receive output current signal $i_o$ at the second output node of switch-mode power stage 12, and provides current reference signal $I_{ref}$ at a first output node, and first voltage reference signal $V_{ref}$ at a second output node. In addition, as previously mentioned, reference ramp control circuit 18a includes an input node coupled to receive first voltage reference signal $V_{ref}$ at the second output node of reference generator circuit 16a, and provides second voltage reference signal $V_{ref}'$ at an output node.

As previously mentioned, switch-mode power stage 12 typically is designed to meet certain specified operating parameters, such as nominal output voltage $v_{nom}$, nominal output current $i_{nom}$, maximum output current $i_{max}$, and maximum output power $P_{max}$. In accordance with this invention, reference generator circuit 16a receives specified operating parameters $v_{nom}$, $i_{nom}$, $i_{max}$, and $P_{max}$, and generates first voltage reference signal $V_{ref}$ and current reference signal $I_{ref}$ based on the value of output current signal $i_o$ to provide the following three modes of operation: (1) voltage mode control with substantially constant output voltage; (2) voltage mode control with substantially constant output power; and (3) current mode control with maximum current limiting.

Figure 5:
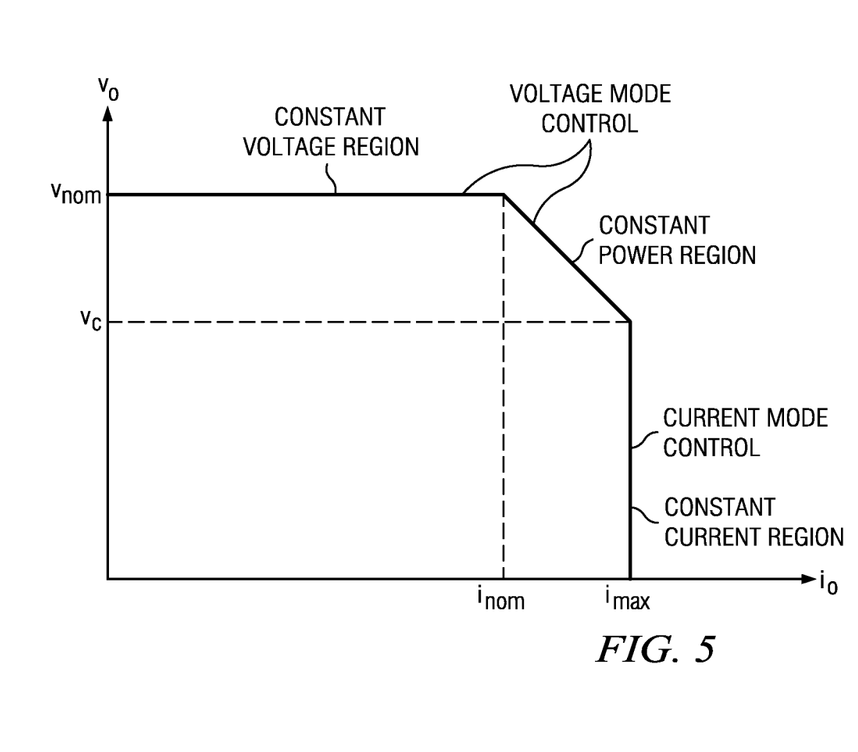
FIG. 5 is a diagram depicting example control modes and operating regions of the power converters of FIGS. 3 and 4.

In particular, FIG. 5 illustrates an example control mode operating diagram and reference generator logic diagram in accordance with this invention. For output current signals $i_o < i_{nom}$, reference generator circuit 16a provides a first voltage reference signal $V_{ref}$ having a value $v_{nom}$, and a current reference signal $I_{ref}$ having a value $i_{max}$. In this operating region, switch-mode power stage 12 operates in voltage mode, and provides an output voltage signal $v_o$ that has a substantially constant value of $v_{nom}$.

For output current signals $i_{nom} \leq i_o < i_{max}$, reference generator circuit 16a provides a first voltage reference signal $V_{ref}$ having a scaled value calculated based on a constant power limit ($P_{max}/i_o$), and a current reference signal $I_{ref}$ having a value $i_{max}$. In this operating region, switch-mode power stage 12 operates in voltage mode, and provides an output power ($P_o = v_o * i_o$) that has a substantially constant value of $P_{max}$.

For output current signals $i_o$ substantially equal to $i_{max}$, reference generator circuit 16a provides a first voltage reference signal $V_{ref}$ having a scaled value $v_c$ ($v_c = P_{max}/i_{max}$), and a current reference signal $I_{ref}$ having a value $i_{max}$. For simplicity, $v_c$ will be referred to herein as "switching voltage $v_c$." In this operating region, switch-mode power stage 12 operates in current mode, and provides an output current signal $i_o$ that is substantially current limited at $i_{max}$.

Thus, for output current signals $i_o < i_{max}$, controller 14a operates switch-mode power stage 12 in voltage mode, and switches to current mode for output current signals $i_o$ substantially equal to $i_{max}$. Thus, loop switching occurs at an output voltage value $v_o$ substantially equal to switching voltage $v_c$, which is lower than nominal voltage $v_{nom}$. By moving the loop switching point to this lower output voltage, any voltage overshoot that occurs when control switches back from current mode to voltage mode (e.g., when load 28 on switch-mode power stage 12 suddenly releases) may become effectively "undetectable." In other words, although voltage overshoot may still occur, output voltage $v_o$ does not exceed $v_{nom}$ by an appreciable amount.

This contrasts with previously known control techniques, which switch from voltage mode to current mode for output current signals $i_o \geq i_{nom}$. In such previously known circuits, loop switching occurs at an output voltage value $v_o = v_{nom}$. As a result, any voltage overshoot that occurs when control switches back from current mode to voltage mode exceeds $v_{nom}$, and may be unacceptably large.

In accordance with this invention, anti-saturation techniques may be used for voltage control loop 20a. In particular, anti-saturation may be achieved by stopping integration in filter 34a when the control is switched to constant current mode. Anti-saturation is desirable so that voltage loop 20a may quickly get out of deep saturation when output voltage $v_o$ starts surpassing its set value. Integrator unwinding relies on the negative error caused by the overshoot.

To avoid the overshoot, a negative error should be introduced after the loop switching and during $v_o$ recovering. To do so, second voltage reference $V_{ref}'$ can be lowered accordingly. For example, first voltage reference signal $V_{ref}$ (and therefore second voltage reference signal $V_{ref}'$) can be set to switching voltage $v_c$. When the output load drops, and control switches from current mode control to voltage mode control, reference ramp control circuit 18*a* ramps second voltage reference signal $V_{ref}'$ from switching voltage $v_c$ to $v_{nom}$. The ramp time interval can be controlled so that the overshoot can be reduced or substantially eliminated. For example, the ramp time interval may be between about 1 millisecond ("ms") to about 100 ms, although other ramp time intervals may be used.

Constant Power/Current Control in Average Current Mode Controllers

Figure 6:
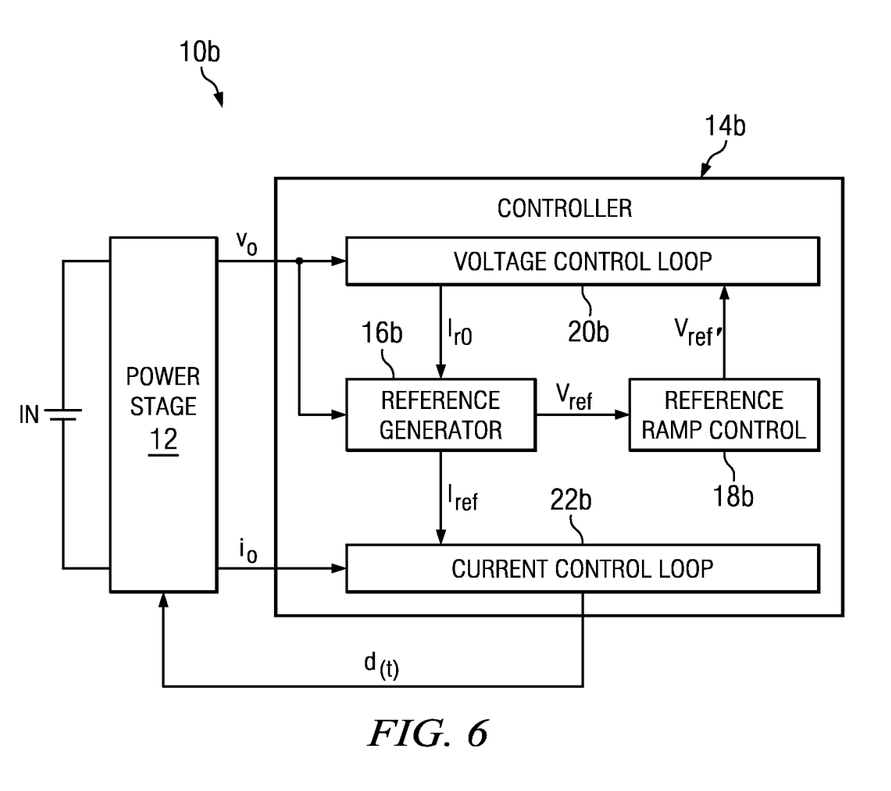
FIG. 6 is a block diagram of an alternative example embodiment of the power converter of FIG. 1.

Referring now to FIG. 6, a block diagram of an example power converter 10*b* is described that uses average current mode control, and that implements constant power/current control in accordance with this invention. In particular, controller 14*b* includes a reference generator 16*b*, a reference ramp control circuit 18*b*, a voltage control loop 20*b* and a current control loop 22*b*. Each of these will be described in turn.

Reference generator circuit 16*b* includes a first input node coupled to receive output voltage signal $v_o$ at the first output node of switch-mode power stage 12, and a first current reference signal $I_{r0}$ provided at an output node of voltage control loop 20*b*, and provides a second current reference signal $I_{ref}$ at a first output node, and a voltage reference signal $V_{ref}$ at a second output node. Reference generator circuit 16*b* may be implemented in hardware and/or software, and will be described in more detail below.

Reference ramp control circuit 18*b* includes an input node coupled to receive first voltage reference signal $V_{ref}$ at the second output node of reference generator circuit 16*b*, and provides a second voltage reference signal $V_{ref}'$ at an output node. Reference ramp control circuit 18*b* may be implemented in hardware and/or software, and will be described in more detail below.

Voltage control loop 20*b* includes a first input node coupled to receive output voltage signal $v_o$ at the first output node of switch-mode power stage 12, and a second input node coupled to receive second voltage reference signal $V_{ref}'$ at the output node of reference ramp control circuit 20*a*, and provides first current reference signal $I_{r0}$ at an output node. Voltage control loop 20*b* may be implemented in hardware and/or software, and will be described in more detail below.

Current control loop 22*b* includes a first input node coupled to receive output current signal $i_o$ at the second output node of switch-mode power stage 12, and a second input node coupled to receive current reference signal $I_{ref}$ at the first output node of reference generator circuit 16*b*, and provides control signal d(t) at an output node coupled to the second input node of switch-mode power stage 12. Current control loop 22*b* may be implemented in hardware and/or software, and will be described in more detail below.

As described in more detail below, voltage control loop 20*b* generates current reference signal $I_{r0}$ based on a difference between output voltage signal $v_o$ and second voltage reference signal $V_{ref}'$, and current control loop 22*b* generates control signal d(t) based on a difference between output current signal $i_o$ and second current reference signal $I_{ref}$.

In addition, as described in more detail below, reference generator 16*b* generates first voltage reference signal $V_{ref}$ and current reference signal $I_{ref}$ to provide average current mode control of switch-mode power stage 12.

Further, as described in more detail below, reference ramp control circuit 18*b* generates second voltage reference signal $V_{ref}'$ based on first voltage reference signal $V_{ref}$. In particular, $V_{ref}'=V_{ref}$ except when controller 14*b* switches from constant current mode to average current mode. In that instance, second voltage reference signal $V_{ref}'$ ramps up from first voltage reference signal $V_{ref}$ to nominal output voltage $v_{nom}$.

Figure 7:
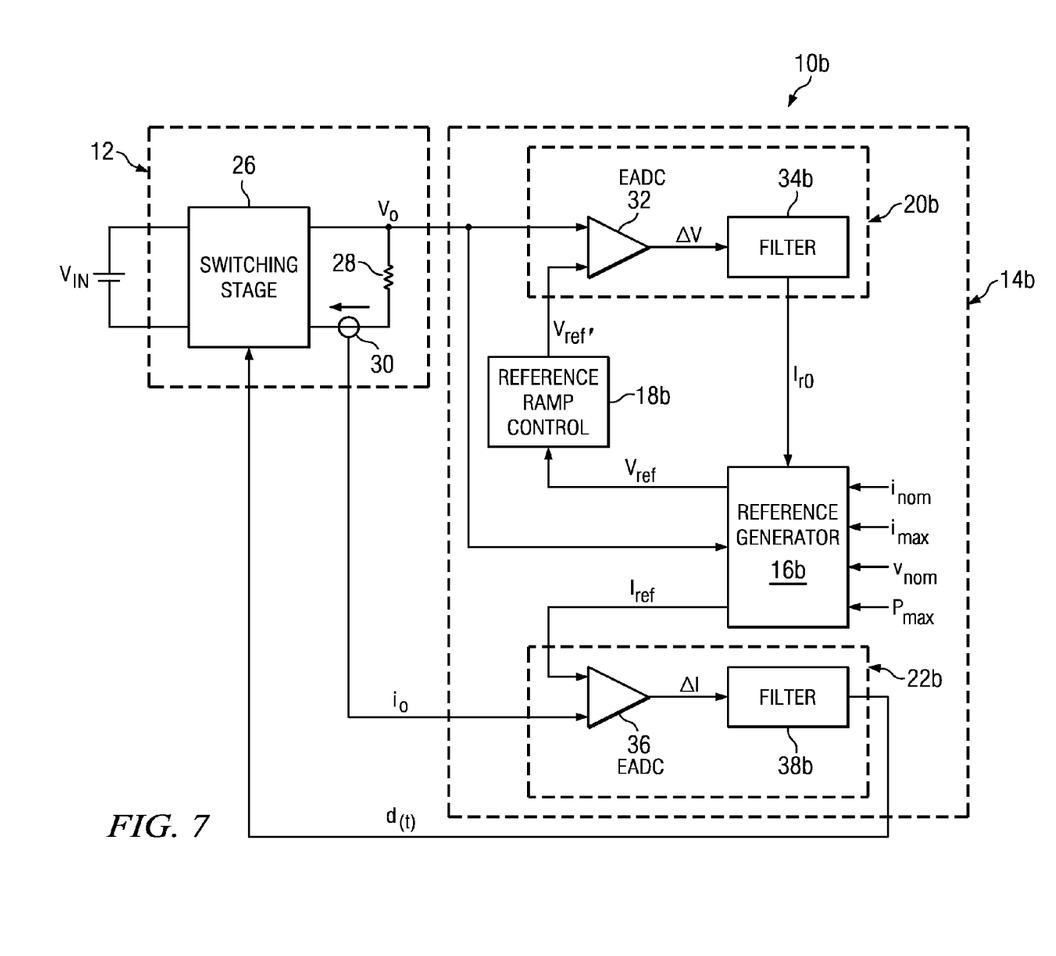
FIG. 7 is a more detailed block diagram of the power converter of FIG. 6.

Referring now to FIG. 7, a more detailed example embodiment of power converter 10*b* is described. In this example, input signal IN is an input voltage signal $V_{in}$. Persons of ordinary skill in the art will understand that input signal IN alternatively may be an input current signal. For simplicity, the remaining discussion refers to input signal IN as input voltage signal $V_{in}$.

Voltage control loop 20*b* includes EADC 32 and a filter 34*b*. EADC 32 has a first input node coupled to receive output voltage signal $v_o$ at the first output node of switch-mode power stage 12, a second input node coupled to receive second voltage reference signal $V_{ref}'$ at the output node of reference ramp control circuit 18*b*, and provides a voltage error signal $\Delta V$ at an output node.

Second voltage reference signal $V_{ref}'$ equals the desired output voltage of switch-mode power stage 12. Alternatively, second voltage reference signal $V_{ref}'$ may equal a fraction of the desired output voltage of switch-mode power stage 12.

EADC 32 samples the difference between output voltage signal $v_o$ and second voltage reference signal $V_{ref}'$, and converts the difference to a digital voltage error signal $\Delta V$ (e.g., $\Delta V = V_o - V_{ref}$) at a sampling rate $f_{ad1}$, as described above. Persons of ordinary skill in the art will understand that other techniques may be used to generate voltage error signal $\Delta V$. For example, EADC 32 may be replaced with an analog differencing circuit and a conventional A/D converter.

Filter 34*b* has an input node coupled to receive voltage error signal $\Delta V$ at the output node of EADC 32, and provides first current reference signal $I_{r0}$ at an output node. Filter 34*b* conditions output voltage signal $v_o$ so that any differences between output voltage signal $v_o$ and second reference voltage signal $V_{ref}'$ are made small (ideally, $\Delta V = 0$). The conditioning is performed to reduce the difference in the presence of disturbances, such as load steps, input voltage variations, component variations, temperature effects, and other similar disturbances).

For example, filter 34*b* may have a gain of 1000, a first zero at 1 KHz, a second zero at 1 KHz, and a pole at 10 KHz, although other parameters may be used. In some example embodiments, filter 34*b* may be implemented as a PID structure. Persons of ordinary skill in the art will understand that other filter types and parameters may be used. Persons of ordinary skill in the art also will understand that filter 34*b* is sometimes referred to as a "compensator," or a "control law accelerator" (e.g., for digital implementations).

Current control loop 22*b* includes EADC 36 and a filter 38*b*. EADC 36 has a first input node coupled to receive output current signal $i_o$ at the second output node of switch-mode power stage 12, a second input node coupled to receive second current reference signal $I_{ref}$ at the first output node of reference generator circuit 16*b*, and provides a current error signal $\Delta I$ at an output node.

Second current reference signal $I_{ref}$ equals the desired output current of switch-mode power stage 12. Alternatively, second current reference signal $I_{ref}$ may equal a fraction of the desired output current of switch-mode power stage 12.

EADC 36 samples the difference between output current signal $i_o$ and second current reference signal $I_{ref}$, and converts the difference to a digital current error signal ΔI (e.g., ΔI=$i_o$−$i_{ref}$) at a sampling rate $f_{ad2}$, as described above. Persons of ordinary skill in the art will understand that other techniques may be used to generate current error signal ΔI. For example, EADC 36 may be replaced with an analog differencing circuit and a conventional A/D converter.

Filter 38b has an input node coupled to receive current error signal ΔI at the output node of EADC 36, and provides control signal d(t) at an output node. Filter 38b conditions output current signal $i_o$ so that any differences between output current signal $i_o$ and second reference current signal $I_{ref}$ are made small (ideally, ΔI=0). The conditioning is performed to reduce the difference in the presence of disturbances, such as load steps, input voltage variations, component variations, temperature effects, and other similar disturbances).

For example, filter 38b may have a gain of 1000, a first zero at 1 KHz, a second zero at 1 KHz, and a pole at 10 KHz, although other parameters may be used. In some example embodiments, filter 38b may be implemented as a PID structure. Persons of ordinary skill in the art will understand that other filter types and parameters may be used. Persons of ordinary skill in the art also will understand that filter 38b is sometimes referred to as a "compensator," or a "control law accelerator" (e.g., for digital implementations).

As previously mentioned, reference generator circuit 16b includes an input node coupled to receive output voltage signal $v_o$ at the first output node of switch-mode power stage 12, and provides second current reference signal $I_{ref}$ at a first output node, and first voltage reference signal $V_{ref}$ at a second output node. In addition, as previously mentioned, reference ramp control circuit 18b includes an input node coupled to receive first voltage reference signal $V_{ref}$ at the second output node of reference generator circuit 16b, and provides second voltage reference signal $V_{ref}'$ at an output node.

In accordance with this invention, reference generator circuit 16b receives specified operating parameters $v_{nom}$, $i_{nom}$, $i_{max}$, and $P_{max}$, and generates first voltage reference signal $V_{ref}$ and current reference signal $I_{ref}$ based on the value of first current reference signal $I_{r0}$ (which, as describe below, is the filter output of voltage control loop 20b), to provide the following three modes of operation: (1) average current mode control with substantially constant output voltage; (2) average current mode control with substantially constant output power; and (3) current mode control with maximum current limiting.

Figure 8:
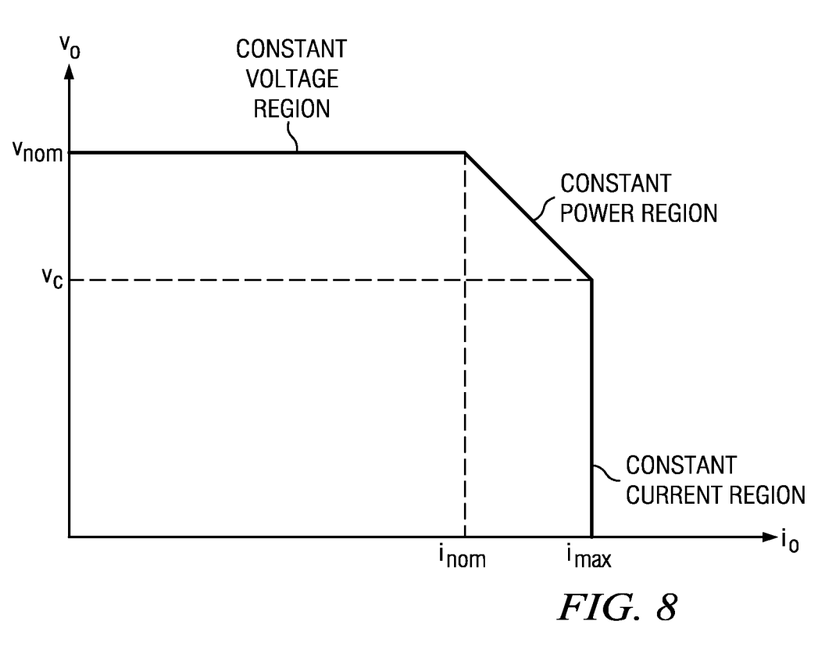
FIG. 8 is a diagram depicting example control modes and operating regions of the power converters of FIGS. 6 and 7.

In particular, FIG. 8 illustrates an example control mode operating diagram and reference generator logic diagram in accordance with this invention. For first current reference signals $I_{r0} < i_{nom}$, reference generator circuit 16b provides a first voltage reference signal $V_{ref}$ having a value $v_{nom}$, and a second current reference signal $I_{ref}$ that equals first current reference signal $I_{r0}$. In this operating region, switch-mode power stage 12 operates in average current mode, and switch-mode power stage 12 provides an output voltage signal $v_o$ that has a substantially constant value of $v_{nom}$.

For first current reference signals $i_{nom} \le I_{r0} < i_{max}$, reference generator circuit 16b provides a first voltage reference signal $V_{ref}$ having a value equal to nominal output voltage $v_{nom}$ plus a small difference δ, and a second current reference signal $I_{ref}$ calculated based on a constant power limit, ($P_{max}/v_o$). In this operating region, switch-mode power stage 12 operates in average current mode control, and switch-mode power stage 12 provides an output power ($P_o = v_o * i_o$) that has a substantially constant value of $P_{max}$.

For first current reference signal $I_{r0}$ substantially equal to $i_{max}$, reference generator circuit 16b provides a first voltage reference signal $V_{ref}$ having a value equal to switching voltage $v_c$ ($v_c = P_{max}/i_{max}$), and a second current reference signal $I_{ref}$ having a value $i_{max}$. In this operating region, switch-mode power stage 12 operates in constant current mode control, and provides an output current signal $i_o$ that is substantially current limited at $i_{max}$.

Thus, in all modes of operation, current control loop 22b sets the value of control signal d(t). In addition, the voltage loop's output is clamped by reference generator 16b, so it essentially tracks output voltage $v_o$, and provides a small error δ between $V_{ref}$ and $v_o$ to prevent or minimize output voltage $v_o$ overshoot when the load suddenly drops. Because the circuit operates in average current mode control, and control signal d(t) is always generated by current control loop 22b, the operation mode switching may be smoother than the example embodiment of FIGS. 3 and 4.

Nevertheless, the average current mode control embodiment of FIGS. 6 and 7 has the same output voltage $v_o$ overshoot issue when a load is suddenly released, and control switches from constant current mode to constant voltage mode with average current mode control. Accordingly, to prevent output voltage $v_o$ overshoot, as described above, anti-saturation control is employed to disable compensator's integration when control switches to constant power mode.

In particular, when the output load drops, and control switches from constant current mode control to constant voltage mode control, reference ramp control circuit 18b ramps second voltage reference signal $V_{ref}'$ from switching voltage $v_c$ to $v_{nom}$. The ramp time interval can be controlled so that the overshoot can be reduced or substantially eliminated. For example, the ramp time interval may be between about 1 ms to about 100 ms, although other ramp time intervals may be used.

The foregoing merely illustrates the principles of this invention, and various modifications can be made by persons of ordinary skill in the art without departing from the scope and spirit of this invention.

The invention claimed is:

1. A control circuit for use with a switch-mode power stage that provides an output voltage signal and an output current signal at an output power, the switch-mode power stage comprising a nominal voltage, a nominal current, a maximum current, an output power and a maximum power, the control circuit comprising: a voltage control loop; and a current control loop; wherein the control circuit only uses the voltage control loop to provide voltage mode control if the output current signal is greater than or equal to the nominal current and less than the maximum current, wherein the output power is constant, further comprising a reference ramp control circuit that provides a reference voltage signal to the voltage control loop, wherein the reference voltage has a value that ramps from a voltage less than the nominal output voltage to the nominal output voltage over a ramp time interval.

2. The control circuit of claim 1, wherein the control circuit switches from voltage mode control to current mode control when the output current signal equals the maximum current.

3. The control circuit of claim 2, wherein switching occurs at an output voltage equal to the maximum power divided by the maximum current.

4. The control circuit of claim 2, wherein the switch-mode power stage is coupled to a load, and wherein the control circuit switches from current mode control to voltage mode control when the load is released from a maximum current operation of the switch-mode power stage.

5. The control circuit of claim 1, wherein the control circuit causes an operating mode of the switch-mode power stage to switch from constant voltage mode to constant current mode at an output voltage less than the nominal output voltage.

6. The control circuit of claim 1, wherein the ramp time interval is set to reduce voltage overshoot on the output voltage.

7. A control circuit for use with a switch-mode power stage that provides an output voltage signal and an output current signal at an output power, the switch-mode power stage comprising a nominal voltage, a nominal current, a maximum current, an output power and a maximum power, the control circuit comprising: a voltage control loop; and a current control loop; wherein the control circuit only uses the current control loop to provide average current mode control if the output current signal is greater than or equal to the nominal current and less than the maximum current, wherein the output power is constant, further comprising a reference ramp control circuit that provides a reference voltage signal to the voltage control loop, wherein the reference voltage has a value that ramps from a voltage less than the nominal output voltage to the nominal output voltage over a ramp time interval.

8. The control circuit of claim 7, wherein the control circuit switches from constant power mode control to constant current mode control when the output current signal substantially equals the maximum current.

9. The control circuit of claim 8, wherein switching occurs at an output voltage equal to the maximum power divided by the maximum current.

10. The control circuit of claim 8, wherein the switch-mode power stage is coupled to a load, and wherein the control circuit switches from constant current mode control to constant power mode control or constant voltage mode control when the load is released from the switch-mode power stage.

11. The control circuit of claim 7, wherein the control circuit causes an operating mode of the switch-mode power stage to switch from constant voltage mode to constant power mode at an output voltage less than the nominal output voltage.

12. The control circuit of claim 7, wherein the ramp time interval is set to reduce voltage overshoot on the output voltage.

13. A method for controlling a switch-mode power stage that provides an output voltage signal and an output current signal at an output power, the switch-mode power stage comprising a nominal voltage, a nominal current, a maximum current, an output power and a maximum power, the method comprising:
 using only voltage mode control to provide a constant output power if the output current signal is greater than or equal to the nominal current and less than the maximum current, further comprising:
 using a voltage control loop to provide voltage mode control; and
 providing a reference voltage signal to the voltage control loop, wherein the reference voltage has a value that ramps from a voltage less than the nominal output voltage to the nominal output voltage over a ramp time interval, wherein the ramp time interval is set to reduce voltage overshoot on the output voltage.

14. The method of claim 13, further comprising switching from voltage mode control to current mode control when the output current signal equals the maximum current.

15. The method of claim 14, wherein switching from constant voltage mode to constant power mode occurs at an output voltage less than the nominal output voltage.

16. The method of claim 14, wherein switching from constant power mode to constant current mode occurs at an output voltage equal to the maximum power divided by the maximum current.

* * * * *